US010849180B2

(12) United States Patent
Karimli et al.

(10) Patent No.: US 10,849,180 B2
(45) Date of Patent: Nov. 24, 2020

(54) DYNAMIC SPECTRUM SHARING IN 4G AND 5G

(71) Applicant: T-Mobile USA, Inc., Bellevue, WA (US)

(72) Inventors: Yasmin Karimli, Kirkland, WA (US); Gunjan Nimbavikar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 100 days.

(21) Appl. No.: 16/209,688

(22) Filed: Dec. 4, 2018

(65) Prior Publication Data

US 2020/0178334 A1    Jun. 4, 2020

(51) Int. Cl.

| | | |
|---|---|---|
| *H04W 4/00* | (2018.01) |
| *H04W 76/16* | (2018.01) |
| *H04W 48/18* | (2009.01) |
| *H04L 5/00* | (2006.01) |
| *H04W 48/06* | (2009.01) |
| *H04W 72/04* | (2009.01) |

(Continued)

(52) U.S. Cl.
CPC .......... *H04W 76/16* (2018.02); *H04L 5/0007* (2013.01); *H04L 5/0035* (2013.01); *H04L 5/0064* (2013.01); *H04W 28/0268* (2013.01); *H04W 48/06* (2013.01); *H04W 48/18* (2013.01); *H04W 72/0453* (2013.01); *H04W 88/06* (2013.01)

(58) Field of Classification Search
None
See application file for complete search history.

(56) References Cited

U.S. PATENT DOCUMENTS 10,440,665 B1 * 10/2019 Witherell ............ H04W 52/223
2012/0057533 A1    3/2012 Junell et al.
(Continued)

FOREIGN PATENT DOCUMENTS

KR    20160101185 A    8/2016

OTHER PUBLICATIONS

KDDI, "Dynamic resource sharing for UL LTE-NR coexistence", 3GPP TSG RAN WG1 Meeting #88, Feb. 7, 2017, section 2; and figures 1-2, 5 pages.
(Continued)

*Primary Examiner* — Zewdu A Beyen
(74) *Attorney, Agent, or Firm* — Lee & Hayes, P.C.

(57) ABSTRACT

Techniques for dynamically allocating frequency resources in accordance with wireless access technologies are discussed herein. For example, a base station can determine whether user equipment (UE) requesting communications at the base station are configured to operate in accordance with $4^{th}$ Generation (5G) radio access technologies and/or in accordance with $5^{th}$ Generation (5G) radio access technologies. Based on the number of 5G UEs and 4G UEs, a first portion of a frequency resource can be allocated to 5G and a second portion of the frequency resource can be allocated to 4G. In some examples, a first allocation strategy for a first frequency resource (e.g., Band 71) can be used to generate a second allocation strategy for a partially overlapping second frequency resource (e.g., Band 41).

17 Claims, 6 Drawing Sheets

(51) Int. Cl.
*H04W 28/02* (2009.01)
*H04W 88/06* (2009.01)

(56) References Cited

U.S. PATENT DOCUMENTS

| | | |
|---|---|---|
| 2012/0124263 A1 | 5/2012 | Zhou et al. |
| 2015/0029950 A1 | 1/2015 | Rath et al. |
| 2019/0069210 A1* | 2/2019 | Lee .................... H04W 36/0061 |
| 2019/0268950 A1* | 8/2019 | Youtz ................. H04W 52/367 |

OTHER PUBLICATIONS

PCT Search Report and Written Opinion dated Mar. 5, 2020, for PCT Application No. PCT/US2019/062376, 11 pages.

* cited by examiner

```
┌─────────────────────────────────────────────────────────────┐
│ RECEIVE, FROM A FIRST USER EQUIPMENT (UE), A FIRST INDICATION│
│              OF A FIRST COMMUNICATION REQUEST               │
│                            402                              │
└─────────────────────────────────────────────────────────────┘
                              ↓
┌─────────────────────────────────────────────────────────────┐
│ DETERMINE A FIRST NUMBER OF A FIRST PLURALITY OF UEs THAT ARE│
│    CONFIGURED TO COMMUNICATE USING A FIRST RADIO ACCESS      │
│ TECHNOLOGY AND A SECOND RADIO ACCESS TECHNOLOGY, WHEREIN     │
│ THE FIRST UE IS ONE OF THE FIRST PLURALITY OF UEs, AND WHEREIN│
│   THE FIRST PLURALITY OF UEs HAVE REQUESTED A FIRST PLURALITY│
│  OF COMMUNICATIONS ASSOCIATED WITH A NON-GUARANTEED BIT RATE │
│                  (GBR) COMMUNICATION TYPE                   │
│                            404                              │
└─────────────────────────────────────────────────────────────┘
                              ↓
┌─────────────────────────────────────────────────────────────┐
│   RECEIVE, FROM A SECOND UE, A SECOND INDICATION OF A SECOND │
│                    COMMUNICATION REQUEST                     │
│                            406                              │
└─────────────────────────────────────────────────────────────┘
                              ↓
┌─────────────────────────────────────────────────────────────┐
│  DETERMINE A SECOND NUMBER OF A SECOND PLURALITY OF UEs      │
│   THAT ARE CONFIGURED TO COMMUNICATE USING THE FIRST RADIO   │
│      ACCESS TECHNOLOGY AND NOT THE SECOND RADIO ACCESS       │
│   TECHNOLOGY, WHEREIN THE SECOND UE IS ONE OF THE SECOND     │
│   PLURALITY OF UEs, AND WHEREIN THE SECOND PLURALITY OF UEs  │
│  HAVE REQUESTED SECOND COMMUNICATIONS ASSOCIATED WITH THE    │
│                  NON-GBR COMMUNICATION TYPE                  │
│                            408                              │
└─────────────────────────────────────────────────────────────┘
                              ↓
┌─────────────────────────────────────────────────────────────┐
│ ALLOCATE, FOR A TIME PERIOD AND BASED AT LEAST IN PART ON THE│
│   FIRST NUMBER OF THE FIRST PLURALITY OF UEs AND THE SECOND  │
│    NUMBER OF THE SECOND PLURALITY OF UEs, A FIRST SET OF     │
│  FREQUENCY RESOURCES TO THE FIRST BASE STATION CONFIGURED    │
│   TO COMMUNICATE IN ACCORDANCE WITH THE FIRST RADIO ACCESS   │
│   TECHNOLOGY AND A SECOND SET OF FREQUENCY RESOURCES TO A    │
│       SECOND BASE STATION CONFIGURED TO COMMUNICATE IN       │
│     ACCORDANCE WITH THE SECOND RADIO ACCESS TECHNOLOGY       │
│                            410                              │
└─────────────────────────────────────────────────────────────┘
```

DYNAMIC SPECTRUM SHARING IN 4G AND 5G

BACKGROUND

Traditionally, service providers have obtained licenses to conduct wireless communications in a particular range of frequencies, and accordingly, have programmed base stations in a wireless network to use a fixed set of frequency resources. However, numbers of user devices have grown over time, greatly increasing an amount of wireless traffic to be handled by the wireless networks.

In some cases, frequency resources can be utilized in accordance with different radio access technologies. Long-Term Evolution (LTE) is an example of a widely implemented radio access technology that is used in $4^{th}$-Generation (4G) communication systems. New Radio (NR) is a newer radio access technology that is used in $5^{th}$-Generation (5G) communication systems. Standards for LTE and NR radio access technologies have been developed by the $3^{rd}$-Generation Partnership Project (3GPP) for use within cellular communication networks by wireless communication carriers. Note that the terms 4G and LTE are often used interchangeably when referencing certain 4G systems and components. Also, NR radio access technology may at times be referred to as 5G radio access technology. That is, the terms NR and 5G can also be used interchangeably when referencing certain 5G systems and components.

Devices that can communicate in accordance with 5G radio access technologies can often communicate in accordance with 4G radio access technologies. However, legacy devices configured in accordance with 4G radio access technologies often are not compatible with 5G radio access technologies. Accordingly, a portion of a frequency resource must often be dedicated to providing service to 4G devices, which can reduce an availability of resources for devices configured in accordance with 5G radio access technologies.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems, devices, and methods are directed to dynamically allocating frequency resources in wireless networks. In some cases, dynamic frequency allocation can be based at least in part on device capabilities of user equipments (UEs) and services requested by such UEs, as discussed herein. To allocate particular frequency resources to the 4G base station or the 5G base station, device capability information can be collected for UEs in communication with the base station (e.g., by accessing a database using an equipment identifier) to determine capabilities of UEs to be served by the base station. Based on a first number of UEs capable of using the 5G base station and a second number of UEs capable of (e.g., limited to) using the 4G base station, individual frequencies or individual blocks of frequencies within a frequency resource can be allocated for 5G operation or 4G operation. In some cases, as the one or more base stations can serve various geographic regions using the various frequency resources (e.g., Band 71, Band 41, CBRS, etc.), a frequency allocation for a first frequency resource (e.g., a proportion of a frequency resource dynamically allocated to one of 5G devices or 4G devices) can be used to allocate frequencies for a second frequency resource.

In some cases, one or more base stations can be configured to wirelessly communicate with UE using a plurality of frequency resources and/or using a plurality of radio access technologies. Examples of frequency resources can include, but are not limited to, frequencies associated with Band 71, Band 41, and Citizens Broadband Radio Service (CBRS). Examples of radio access technologies include, but are not limited to, a $4^{th}$ Generation (4G) radio access technology and a $5^{th}$ Generation (5G) radio access technology. In some cases, a 4G base station and a 5G base station can be configured to operate using the same particular frequency resources, although it can be understood that such a particular frequency resource can be allocated to one of the 4G base station or the 5G base station to prevent or minimize interference, especially in cases of overlapping coverage areas.

In some cases, user equipment configured to communicate using a 5G radio access technology and a 4G radio access technology can be referred to as a "5G device" or a "5G UE," while user equipment configured to communicate using a 4G radio access technology but not configured to use a 5G access technology can be referred to as a "4G device" or a "4G UE."

By way of example, a base station (e.g., a 4G base station or a 5G base station) can receive a communication request from a UE in an environment. In some cases, the communication request can correspond to a non-guaranteed bit rate (GBR) communication type (e.g., having a Quality of Service (QoS) Class Identifier (QCI) between 5-9, 69, 70, or 79). In some cases, the communication request may be associated with the International Mobile Equipment Identifier (IMEI) number of the UE (or another identifier of the UE), which can be used to determine the device capabilities of the UE associated with the communication request. Over time, a computing device or a base station can determine a first number of UEs that are requesting non-GBR communications from a 5G base station and a second number of UEs that are requesting non-GBR communications from a 4G base station. Based at least in part on the first number of 5G UEs and the second number of 4G UEs, frequencies in a frequency resource can be allocated to the 5G base station or the 4G base station.

In some cases, the frequencies in a frequency resource can be allocated based at least in part on an allocation model. For example, an allocation model can include allocation strategies based on a ratio of 5G UEs and 4G UEs within a cell or geographic area. In some cases, an allocation model can be biased to provide additional frequency resources to the 5G base station in order to ensure that, in a case with similarly-situated 5G UEs and 4G UEs (e.g., in terms of communication type (e.g., GBR, non-GBR), signal strength, etc.), additional frequency resources can be provided to the 5G base station. In some cases, an allocation model can be implemented to ensure that a bandwidth available to 5G UEs is larger than a bandwidth available to 4G UEs, or vice versa. In some cases, if a congestion level of a 5G base station is above a threshold level, or if a congestion level of a 5G base station is above a congestion level of a 4G base station, an allocation model can allocate additional frequency resources to the 5G base station to serve additional 5G UEs. Additional allocation models and examples are discussed throughout this disclosure.

In some instances, a base station or computing device implementing the techniques discussed herein can use frequency resources in at least one of an LTE or 5G Band 71 (e.g., a 600 MHz band), an LTE Band 48 (e.g., 3500 MHz), and the like. In some instances, the frequency resources can include, but are not limited to, LTE or 5G Band 1 (e.g., 2080 MHz), LTE or 5G Band 2 (1900 MHz), LTE or 5G Band 3 (1800 MHz), LTE Band 4 (1700 MHz), LTE or 5G Band 5 (850 MHz), LTE or 5G Band 7 (2600 MHz), LTE or 5G Band 8 (900 MHz), LTE or 5G Band 20 (800 MHz), LTE or 5G Band 28 (700 MHz), LTE or 5G Band 38 (2600 MHz), LTE or 5G Band 41 (2500 MHz), LTE or 5G Band 50 (1500 MHz), LTE or 5G Band 51 (1500 MHz), LTE or 5G Band 66 (1700 MHz), LTE or 5G Band 70 (2000 MHz), LTE or 5G Band 74 (1500 MHz), 5G Band 257 (28 GHz), 5G Band 258 (26 GHz), 5G Band 260 (39 GHz), 5G Band 261 (28 GHz), and the like. In some instances, frequency resources in the range of 600 MHz-6000 MHz can be referred as "low-band" and "mid-band." In some instances, the frequency resources may include "millimeter wave" bands including, but not limited to 26 GHz, 28 GHz, 38 GHz, 60 GHz, and the like. The techniques discussed herein are applicable to any frequency resources, and are not limited to those expressly recited above. For example, in some cases, frequency resources can include any licensed or unlicensed bands. Other examples of frequency resources may include those associated with $2^{nd}$ Generation (2G) radio access technologies, $3^{rd}$ Generation (3G) radio access technologies, and the like.

In one example, when a frequency resource is allocated to a 4G base station, a 5G base station may send a request or command to the 4G base station to release the frequency resource so the frequency resource can be allocated to the 5G base station. In some instances, if a frequency resource has been allocated to a 4G base station, the frequency resource can be deallocated from the 4G base station if a congestion level at the 4G base station is below a threshold level and/or has been below a threshold level for a predetermined period of time.

In one example, if an emergency call (e.g., directed to a public safety answering point (PSAP)) is received at a base station, a frequency resource can be allocated to the emergency call, regardless of the allocation model implemented by a computing device and/or base station.

In some instances, frequency resources can be allocated to base stations using one or more of 3G, 4G LTE, and/or 5G technologies. That is, a computing device and/or a base station can use one or more available technologies and/or bands to allocate frequency resources to one or more base stations in a network.

In some instances, the systems, devices, and techniques described herein can improve a functioning of a network. For example, dynamically allocating frequency resources to base stations can improve the functioning of the network by increasing capacity in times of congestion, interference, etc. In some instances, dynamically allocating frequency resources based on capabilities of UE allows for network optimization based on instantaneous (e.g., near real-time) resource needs. In some cases, an allocation model can be set to optimize a QoS (or any other appropriate consideration for QoS, QoE, or the like) for a particular device type (e.g., a 5G UE or a 4G UE). In some examples, the dynamic frequency allocation can be used to implement business preferences and/or to ensure quality levels are met or exceeded for various devices, subscribers, or subscriber levels. In some instances, the computing device and/or base station can allocate frequency resources in contiguous bands to reduce a scanning burden by UEs in communication with a particular base station. In some instances, deallocating the frequency resources when not needed by the base station can allow other base stations to use such frequency resources as needed. In some instances, implementing the dynamic frequency allocation techniques in a self-organizing network can reduce an amount of processing required (e.g., by network engineers) and/or can reduce any periods of reduced network efficiency or connectivity due to a delay in allocating resources. These and other improvements to the functioning of a computer and network are discussed herein.

The systems, devices, and techniques described herein can be implemented in a number of ways. Example implementations are provided below with reference to the following figures.

Figure 1:
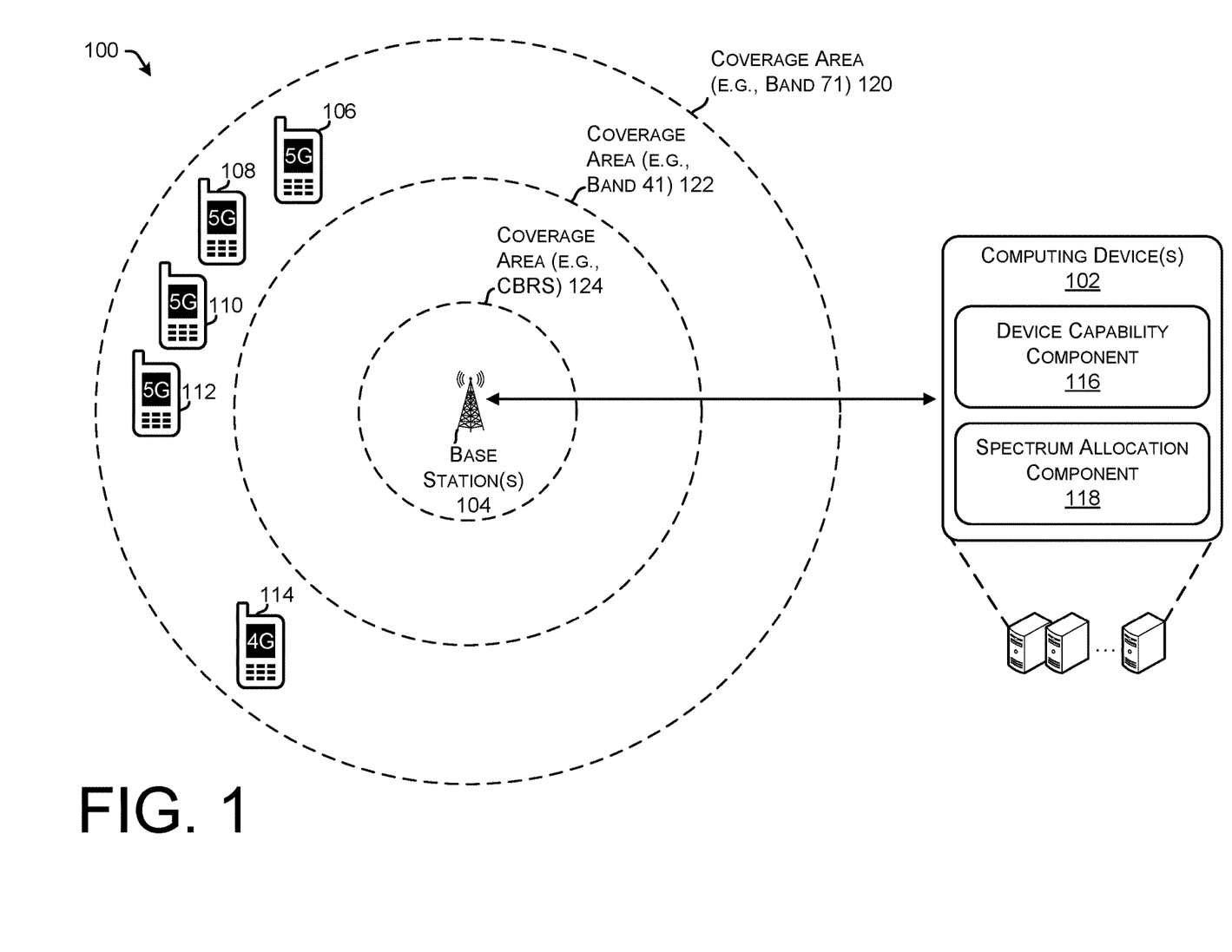
FIG. 1 illustrates an example environment including base station(s) serving user equipments (UEs) using frequency resources having associated coverage areas, wherein frequencies of the frequency resources are dynamically allocated based on device capabilities of UEs in the environment, in accordance with embodiments of the disclosure.

FIG. 1 illustrates an example environment 100 including computing device(s) 102, base station(s) 104, various UEs 106, 108, 110, and 112 (e.g., 5G devices or 5G UEs), and UE 114 (e.g., a 4G device or a 4G UE). The computing device(s) 102 can include a device capability component 116 and a spectrum allocation component 118. The base station(s) 104 can include any number of base stations associated with coverage areas 120, 122, and 124. Of course, the environment 100 can include any number of 5G UEs, 4G UEs, base stations, and computing devices, and is not limited to the specific implementation shown in FIG. 1.

The coverage area 120 can correspond to a coverage area associated with a Band 71 frequency resource band. In some instances, and as discussed herein, a first subset of the Band 71 can be allocated in accordance with the 5G radio access technology and a second subset of the Band 71 can be allocated in accordance with the 4G radio access technology. In some instances, a geographic size of the coverage area 120 is based at least in part on propagation characteristics of the frequency resources and/or the power level of the base station outputting the particular signal. Of course, the coverage area 120 is not limited to Band 71, and may represent any of the frequency resources discussed herein.

The coverage area 122 can correspond to a coverage area associated with a Band 41 frequency resource band. In some instances, and as discussed herein, a first subset of the Band 41 can be allocated in accordance with the 5G radio access technology and a second subset of the Band 41 can be allocated in accordance with the 4G radio access technology. In some instances, a geographic size of the coverage area 122 is based at least in part on propagation characteristics of the frequency resources and/or the power level of the base station outputting the particular signal. Of course, the coverage area 122 is not limited to Band 41, and may represent any of the frequency resources discussed herein.

The coverage area 124 can correspond to a coverage area associated with a Citizens Broadband Radio Service (CBRS) resource band. In some instances, and as discussed herein, a first subset of the CBRS Band can be allocated in accordance with the 5G radio access technology and a second subset of the CBRS Band can be allocated in accordance with the 4G radio access technology. In some instances, a geographic size of the coverage area 124 is based at least in part on propagation characteristics of the frequency resources and/or the power level of the base station outputting the particular signal (e.g., based on a presence of incumbent CBRS users). Of course, the coverage area 124 is not limited to the CBRS Band, and may represent any of the frequency resources discussed herein.

Examples of the user equipment (UE) 106, 108, 110, 112, and 114 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the UE 106, 108, 110, 112, and 114 include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network.

In general, and as discussed above, each UE 106, 108, 110, and 112 can be referred to as a 5G device (or 5G UE) that is capable of communicating in accordance with the 5G radio access technology and the 4G radio access technology. In general, and as discussed above, the UE 114 can be referred to as a 4G device (or 4G UE) that is capable of communicating in accordance with the 4G radio access technology but is not capable of communicating using the 5G radio access technology.

In general, the base station(s) 104 can be implemented as a variety of technologies to provide wired and/or wireless access to the network, as discussed herein. In some instances, the base station(s) 104 can include a 3GPP RAN, such a GSM/EDGE RAN (GERAN), a Universal Terrestrial RAN (UTRAN), or an evolved UTRAN (E-UTRAN), or alternatively, a "non-3GPP" RAN, such as a Wi-Fi RAN, or another type of wireless local area network (WLAN) that is based on the IEEE 802.11 standards. Further, the base station(s) 104 can include any number and type of transceivers and/or base stations representing any number and type of macrocells, microcells, picocells, or femtocells, for example, with any type or amount of overlapping coverage or mutually exclusive coverage. In some cases, a first base station of the base station(s) 104 can comprise a gNodeB base station or a NR (new radio) base station configured in accordance with the 5G radio access technology. In some cases, a second base station of the base stations 104 can comprise an eNodeB base station configured in accordance with the 4G radio access technology.

In general, the device capability component 116 can include functionality to receive device capability information associated with UEs in communication with the base station(s) 104. In some examples, the device capability component 116 can receive, as part of a registration procedure or as part of a communication request, an International Mobile Equipment Identity (IMEI) number from individual UEs in a network. In some instances, the device capability component 116 can further receive capability information indicating whether a particular UE is a 5G UE or a 4G UE. In some instances, the device capability information can be based at least in part on the IMEI number of a UE. In some instances, the device capability component 116 can determine that a UE is associated with a guaranteed bit rate (GBR) communication or a non-GBR communication, which, in some cases, may be based at least in part on QCI information associated with the communication request. In some instances, the device capability component 116 can determine a number of 4G UEs and a number of 5G UEs associated with the base station(s) 104 (e.g., actively communicating (and a number of GBR or non-GBR communications) or idling on the network).

In general, the spectrum allocation component 118 can include functionality to allocate a first portion of a first frequency resource band to a first radio access technology and to allocate a second portion of the first frequency resource band to a second radio access technology, wherein the first portion and the second portion are based at least in part on the device capability information determined by the device capability component 116. In some instances, the first radio access technology can correspond to the 5G radio access technology, while the second radio access technology can correspond to the 4G radio access technology. The spectrum allocation component 118 can allocate the first portion of the first frequency resource band to the 5G UEs based on a number of the 5G UEs (e.g., the UEs 106, 108, 110, and 112). Further, the spectrum allocation component 118 can allocate the second portion of the first frequency resource band after the first portion has been allocated, to ensure that communications associated with the first portion (e.g., serving the 5G UEs) has a QoS or QoE that meets or exceed a threshold (and/or meets or exceeds a QoS or QoE associated with 4G UEs).

Further, in some cases, the spectrum allocation component 118 can allocate, as a first allocation, the first portion of the first frequency resource band to 5G UEs and the second portion of the first frequency resource band to 4G UEs. In some examples, the first frequency resource band can correspond to the coverage area 120. Next, the spectrum allocation component 118 can allocate, as a second allocation, a first portion of a second frequency resource band to 5G UEs and a second portion of the second frequency resource band to 4G UEs. In some examples, the second frequency resources can correspond to the coverage area 122. In some examples, the second allocation can be allocated based at least in part on the first allocation. That is, the second allocation can represent substantially a same proportion of frequency resources allocated to the first portion and the second portion as the first allocation. Accordingly, as the 5G UEs and the 4G UEs move throughout the coverage areas 122 and 124, the frequency resources allocated to the 5G UEs and the 4G UEs can seamlessly provide communications without interruption when a UE utilizes resources in the first frequency resource band or the second frequency resource band.

Further, the spectrum allocation component 118 can allocate, as a third allocation, a first portion of a third frequency resource band to 5G UEs and a second portion of the third frequency resource band to 4G UEs. In some examples, the third frequency resource band can correspond to the coverage area 124. In some examples, the third allocation can be allocated based at least in part on the first allocation and/or the second allocation. That is, the third allocation can represent substantially a same proportion of frequency resources allocated to the first portion and the second portion as the first allocation and/or the second allocation.

Additional examples of allocating portions of the frequency resources bands are discussed below in connection with FIGS. 2A-2D.

FIGS. 2A-2D illustrate example allocation strategies based on communication requests received by UEs in an environment, in accordance with embodiments of the disclosure.

Figure 2A:
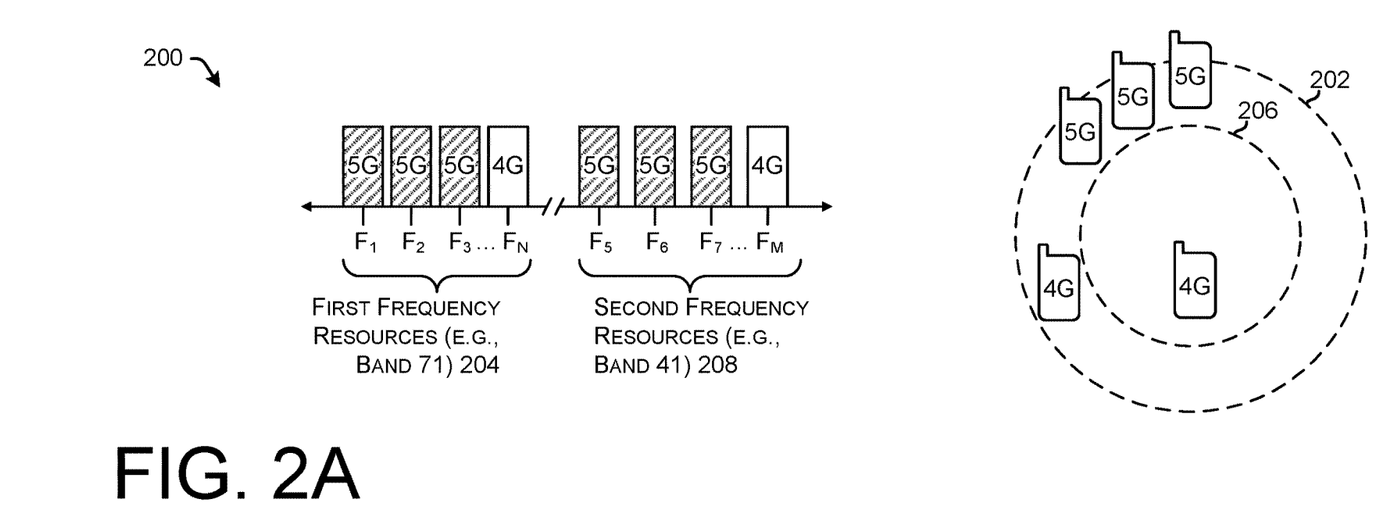
FIGS. 2A-2D illustrate example allocation strategies based on communication requests received by UEs in an environment, in accordance with embodiments of the disclosure.

For example, FIG. 2A illustrates an example 200 including a first allocation strategy. In the example 200, a first coverage area 202 represents a coverage area provided by first frequency resources 204, which in some cases, may correspond to Band 71 frequency resources. Further, a second coverage area 206 may represent a cover area provided by second frequency resources 208, which in some cases, may correspond to Band 41 frequency resources. As illustrated, a first number of 5G UE are within the coverage area 202, a second number of 4G UE are within the coverage area 202, and a third number of 4G UE are within the coverage area 206. As can be understood, the base stations associated with the coverage areas 202 and 206 and network computing devices are not shown in FIGS. 2A-2D for simplicity. Of course, the example 200 may include any number of UEs, coverage areas, and the like, and is not limited to the specific implementation discussed herein.

By way of example, and without limitation, the device capability component 116 can receive device capability information associated with the UEs within the coverage areas 202 and 206 to determine a number of 5G UEs and a number of 4G UEs within the coverage areas 202 and 206. In some examples, for the first frequency resources 204, the spectrum allocation component 118 can allocate portions of the first frequency resources 204 based on the number of 5G UEs within the coverage area 202 and the number of 4G UEs within the coverage area 202. In some instances, the number of 4G UEs within the coverage area 206 may or may not be considered when allocating portions of the first frequency resources 204. In some instances, the number of 5G UEs and 4G UEs within the coverage area 202 can be further limited to UEs associated with a request for a non-GBR communication or to UEs that are conducting a non-GBR communication.

In the example 200, three 5G UEs are illustrated within the coverage area 202, and two 4G UEs are illustrated within the coverage area 202 (including the one 4G UE within the coverage area 206). Based on the number of 5G UEs and the number of 4G UEs, a first portion of the first frequency resources 204 (e.g., frequencies $F_1$, $F_2$, and $F_3$) is allocated to the 5G radio access technology, while a second portion of the first frequency resources 204 is allocated to the 4G radio access technology (e.g., frequencies $F_N$). In some cases, the individual frequencies $F_1$, $F_2$, $F_3$, ..., $F_N$ represent discrete portions of a frequency band (e.g., 100 kHz, 500 kHz, 1 MHz, 5 MHz, etc.).

After the frequencies in the first frequency resources 204 have been allocated, as a first allocation, in accordance with the first allocation strategy, frequencies in the second frequency resources 208 can be allocated as a second allocation. By way of example, and without limitation, a first portion of the second frequency resources 208 (e.g., frequencies $F_5$, $F_6$, and $F_7$) can be allocated to the 5G radio access technology, while a second portion of the second frequency resources 208 can be allocated to the 4G radio access technology (e.g., frequencies $F_M$). That is, the first portion of the second frequency resources 208 can be based at least in part on an absolute or relative size of the first portion of the first frequency resources 204. Similarly, a second portion of the second frequency resources 208 can be based at least in part on an absolute or relative size of the second portion of the second frequency resources 208. Accordingly, even when numbers or proportions of 5G UEs and 4G UEs in the coverage areas 202 and 206 may differ, an allocation strategy can be applied to different coverage areas (and across different frequency resources, respectively) to dynamically allocate frequencies to groups of devices for improved communication experiences.

Figure 2B:
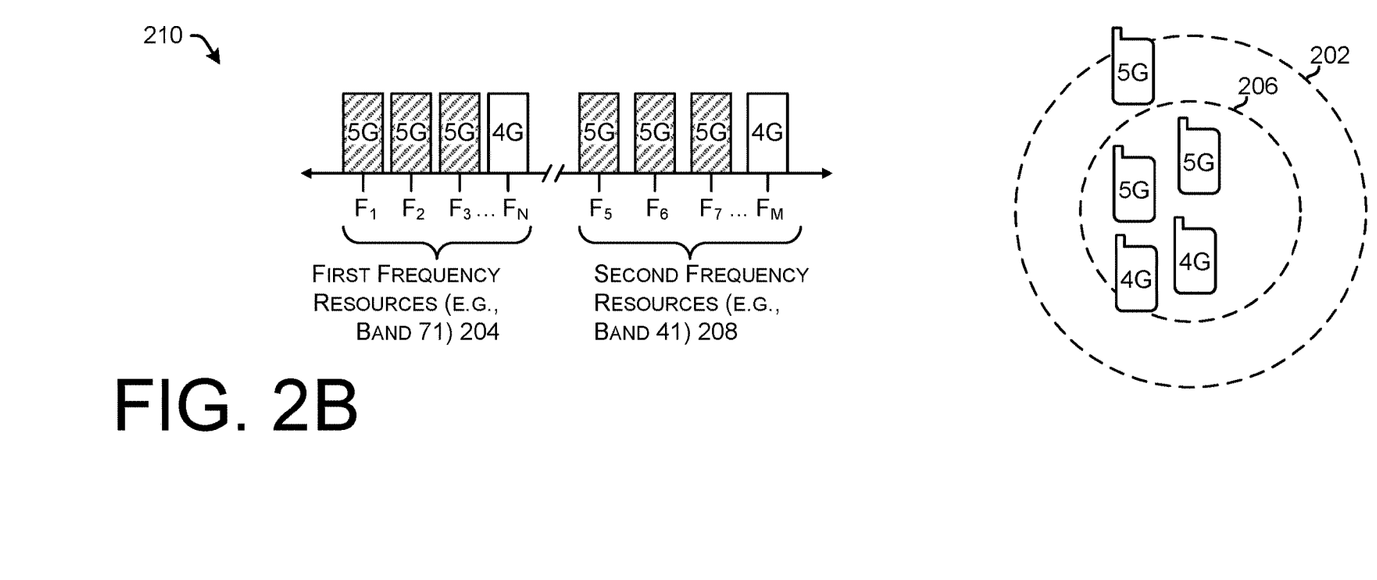

FIG. 2B illustrates an example 210 including a second allocation strategy. In the example 210, a first number of 5G UE are located within the coverage area 202, a second number of 5G UE are located within the coverage area 206, and a third number of 4G UE are located within the coverage area 206.

In the example 210, three 5G UEs are illustrated within the coverage area 202 (inclusive of the 5G UEs in the coverage area 206) and two 4G UEs are located within the coverage area 202 (inclusive of the 4G UEs in the coverage area 206). In a first example, based on the number of 5G UEs and the number of 4G UEs within the coverage area 202, a first portion of the first frequency resources 204 (e.g., frequencies $F_1$, $F_2$, and $F_3$) is allocated to the 5G radio access technology, while a second portion of the first frequency resources 204 is allocated to the 4G radio access technology (e.g., frequencies $F_N$). As noted above, the allocation of the first frequency resources 204 can be used to allocate the second frequency resources 208. Accordingly, even where a number of 5G UEs is substantially the same as a number of 4G UEs (e.g., in the coverage area 206), the second allocation strategy can be biased towards 5G radio access technology (e.g., based on the higher number of 5G UEs within the coverage area 202 and/or based on an allocation model, discussed below in connection with FIG. 3).

Figure 2C:
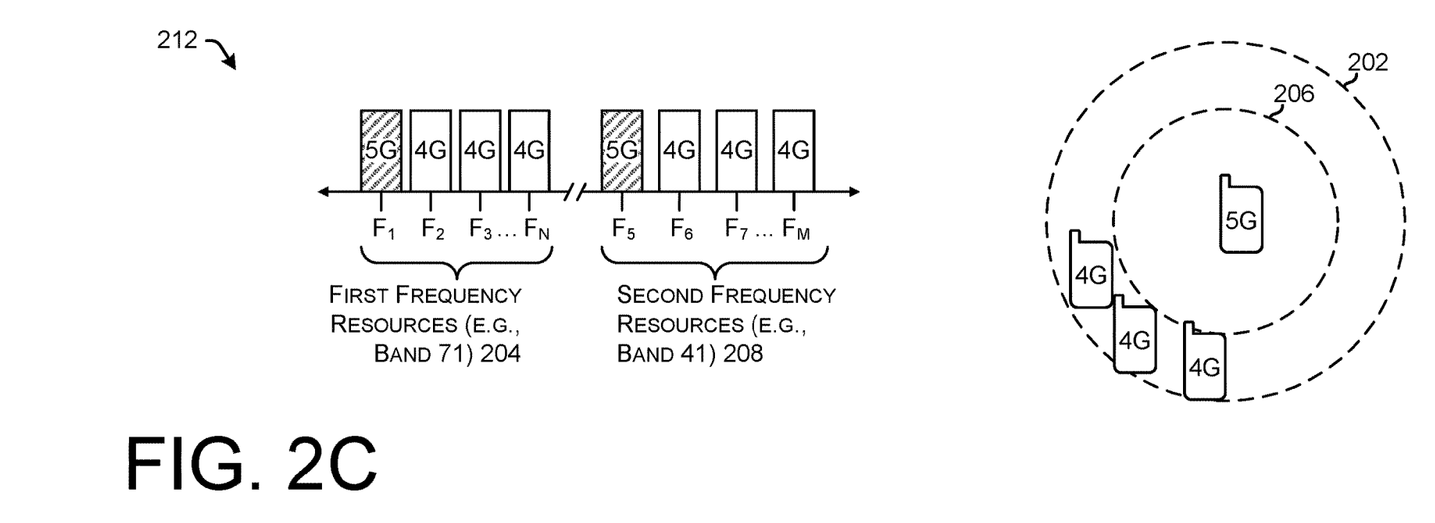

FIG. 2C illustrates an example 212 including a third allocation strategy. In the example 212, a first number of 4G UE are located within the coverage area 202, a second number of 5G UE are located within the coverage area 206, and a third number of 4G UE are located within the coverage area 206.

In the example 212, one 5G UE is illustrated within the coverage area 202 (inclusive of the 5G UE in the coverage area 206) and three 4G UEs are located within the coverage area 202. Based on the number of 5G UEs and the number of 4G UEs within the coverage area 202, a first portion of the first frequency resources 204 (e.g., frequencies $F_1$) is allocated to the 5G radio access technology, while a second portion of the first frequency resources 204 is allocated to the 4G radio access technology (e.g., frequencies $F_2$, $F_3$, ..., $F_N$). As noted above, the allocation of the first frequency resources 204 can be used to allocate the second frequency resources 208.

Figure 2D:
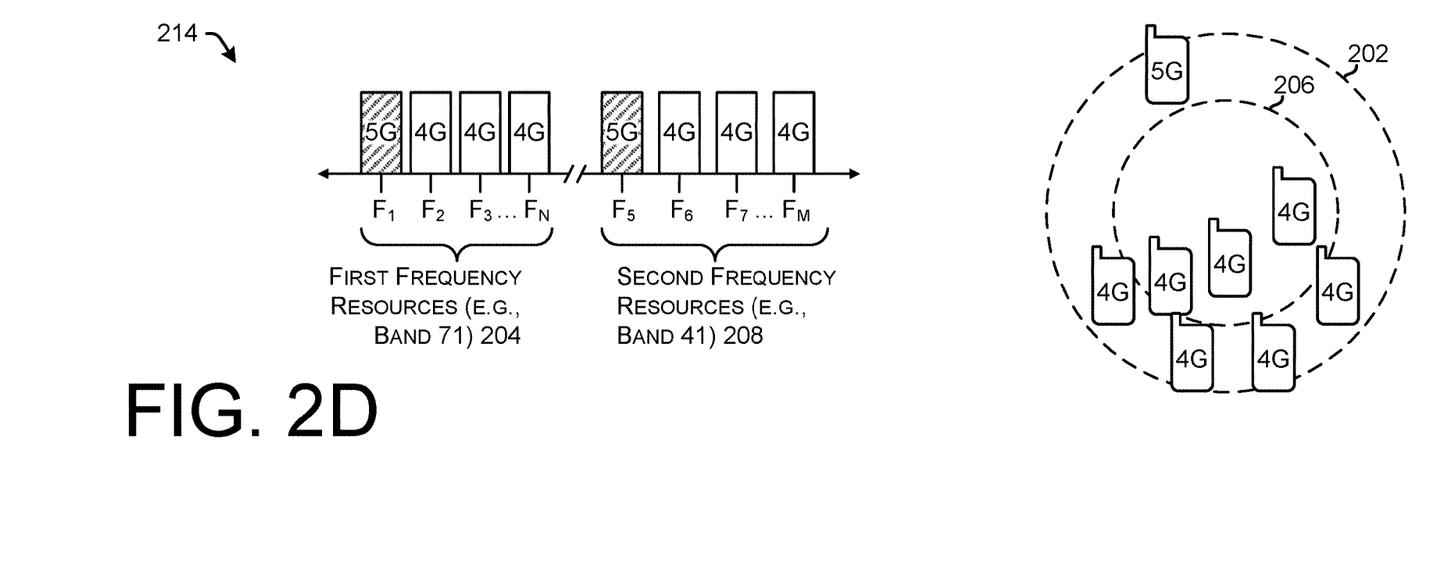

FIG. 2D illustrates an example 214 including a fourth allocation strategy. In the example 214, a first number of 5G UE are located within the coverage area 202, a second number of 4G UE are located within the coverage area 202 (exclusive of the coverage area 206), and a third number of 4G UE are located within the coverage area 206.

In the example 214, one 5G UE is illustrated within the coverage area 202 and seven 4G UEs are located within the coverage area 202 (inclusive of the 4G UE in the coverage area 206). Based on the number of 5G UEs and the number of 4G UEs within the coverage area 202, a first portion of the first frequency resources 204 (e.g., frequencies $F_1$) is allocated to the 5G radio access technology, while a second portion of the first frequency resources 204 is allocated to the 4G radio access technology (e.g., frequencies $F_2$, $F_3$, . . . , $F_N$). As noted above, the allocation of the first frequency resources 204 can be used to allocate the second frequency resources 208.

Note that the application of the third and fourth allocation strategies may result in an "overallocation" of frequency resources biased towards 5G UEs. Accordingly, in some examples (e.g., the example 212), resources may be allocated to the 5G radio access technology (e.g., for the coverage area 202) where no 5G UE are present. However, such an allocation strategy can ensure that a QoS, QoE, bandwidth, and the like is above a threshold based on radio access technology. Further, such an allocation strategy allows for seamless handovers of devices between various frequency resources as devices navigate through various coverage regions.

In some cases, as a UE handsover between the various coverage areas (utilizing various frequency resource bands), the UE can maintain a control plane with a particular frequency resource band. By way of example, and without limitation, a control plane can be provided to a UE in Band 71 while data services can be provided by Band 41. Of course, a control plane and user plane can be provided by a same frequency resource band. Other implementations are considered herein.

Figure 3:
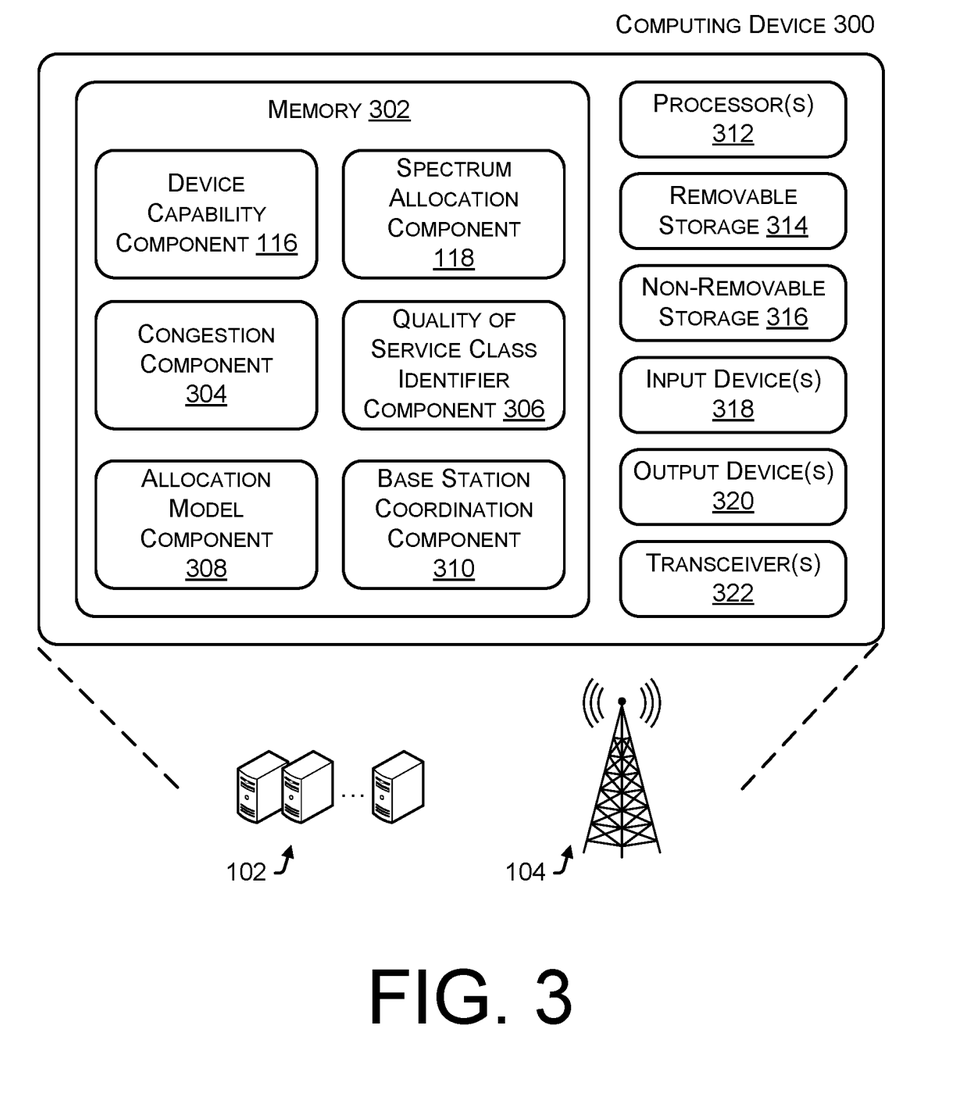
FIG. 3 illustrates an example computing device configured to allocate frequency resources to base station(s) based at least in part on device capability information, in accordance with embodiments of the disclosure.

FIG. 3 illustrates an example computing device 300 configured to allocate frequency resources to base station(s) based at least in part on device capability information, in accordance with embodiments of the disclosure. In some embodiments, the computing device 300 can correspond to the computing device 102 and/or the base station(s) 104 of FIG. 1. It is to be understood in the context of this disclosure that the computing device 300 can be implemented as a single device or as a plurality of devices with components and data distributed among them.

As illustrated, the computing device 300 comprises a memory 302 storing the device capability component 116, the spectrum allocation component 118, a congestion component 304, a Quality of Service (QoS) Class Identifier (QCI) component 306, an allocation model component 308, and a base station coordination component 310. Also, the computing device 300 includes processor(s) 312, a removable storage 314 and non-removable storage 316, input device(s) 318, output device(s) 320, and transceiver(s) 322.

In various embodiments, the memory 302 is volatile (such as RAM), nonvolatile (such as ROM, flash memory, etc.) or some combination of the two. The device capability component 116, the spectrum allocation component 118, the congestion component 304, the QCI component 306, the allocation model component 308, and the base station coordination component 310 stored in the memory 302 can comprise methods, threads, processes, applications or any other sort of executable instructions. The device capability component 116, the spectrum allocation component 118, the congestion component 304, the QCI component 306, the allocation model component 308, and the base station coordination component 310 can also include files and databases.

In general, the device capability component 116 can include functionality to determine capabilities of devices associated with a particular coverage area and/or a particular base station. In some instances, the device capability component 116 can determine whether a UE is a 5G UE or a 4G UE. In some instances, the device capability component 116 can determine a number of 5G UEs and a number of 4G UEs associated with individual coverage areas. In some instances, the device capability component 116 can determine, via information received from the QCI component 306, for example, which of the 5G UEs and the 4G UEs are associated with a guaranteed bit rate (GBR) communication or are associated with a non-GBR communication. In some instances, the device capability component 116 can determine device capabilities based at least in part on an IMEI (or other applicable identifier) received from individual UEs.

In some examples, the device capability component 116 can additionally determine that a UE can support carrier aggregation and/or that a UE can support real time text (RTT), voice, video, data, and the like.

In general, the spectrum allocation component 118 can include functionality to allocate a first portion of a first frequency resource band to a first radio access technology and to allocate a second portion of the first frequency resource band to a second radio access technology, wherein the first portion and the second portion are based at least in part on the device capability information determined by the device capability component 116. Further, the spectrum allocation component 118 can allocate, based at least in part on the first and second portions of the first frequency resource band, a first portion of a second frequency resource band to the first radio access technology and a second portion of the second frequency resource band to the second radio access technology. In some instances, the first radio access technology can correspond to the 5G radio access technology, while the second radio access technology can correspond to the 4G radio access technology. Additional details of the spectrum allocation component 118 are discussed throughout this disclosure.

In some instances, the spectrum allocation component 118 can allocate frequencies associated with at least one of an LTE or 5G Band 71 (e.g., a 600 MHz band), an LTE Band 48 (e.g., 3500 MHz), and the like. In some instances, the frequency resources can include, but are not limited to, LTE or 5G Band 1 (e.g., 2080 MHz), LTE or 5G Band 2 (1900 MHz), LTE or 5G Band 3 (1800 MHz), LTE Band 4 (1700 MHz), LTE or 5G Band 5 (850 MHz), LTE or 5G Band 7 (2600 MHz), LTE or 5G Band 8 (900 MHz), LTE or 5G Band 20 (800 MHz), LTE or 5G Band 28 (700 MHz), LTE or 5G Band 38 (2600 MHz), LTE or 5G Band 41 (2500 MHz), LTE or 5G Band 50 (1500 MHz), LTE or 5G Band 51 (1500 MHz), LTE or 5G Band 66 (1700 MHz), LTE or 5G Band 70 (2000 MHz), LTE or 5G Band 74 (1500 MHz), 5G Band 257 (28 GHz), 5G Band 258 (26 GHz), 5G Band 260 (39 GHz), 5G Band 261 (28 GHz), and the like. In some instances, the frequency resources can include frequencies associated with the CBRS band. The techniques discussed herein are applicable to any frequency resources, and are not limited to those expressly recited above. For example, in some cases, frequency resources can include any licensed or unlicensed bands.

The congestion component 304 can include functionality to receive congestion information or otherwise determine levels of congestions for particular base stations and for particular frequency resources. For example, the congestion component 304 can determine a first congestion level for a first portion of a first frequency resource (e.g., Band 71 allocated to 5G UEs), a second congestion level for a second portion of the first frequency resource (e.g., Band 71 allocated to 4G UEs), a third congestion level for a first portion of a second frequency resource (e.g., Band 41 allocated to 5G UEs), a fourth congestion level for a second portion of the second frequency resource (e.g., Band 41 allocated to 4G UEs), and the like. In some instances, the congestion component 304 can receive load information associated with frequency resources and/or base stations. In some examples, the load information can include but is not limited to: a number of UEs connected to a base station (and/or associated with a frequency resource); an amount of bandwidth and traffic handled by the base station (e.g., relative to a total amount of bandwidth) (and/or associated with a frequency resource); a size of packet queues associated with a base station (and/or associated with a frequency resource); a number of dropped packets of the base station (and/or associated with a frequency resource); a delay associated with one or more communication of the base station (and/or associated with a frequency resource); a number of channels used by one or more UEs (and/or associated with a frequency resource); a packet jitter associated with the base station (and/or associated with a frequency resource); and the like.

The QCI component 306 can include functionality to receive QCI information associated with an active communication of a UE and/or to determine a QCI associated with a request to initiate a communication. In some instances, the QCI component can receive QCI information to determine whether the communication is a GBR communication or a non-GBR communication. As discussed herein, in some instances, the allocation strategies discussed herein can be based on non-GBR communications. In some instances, the allocation strategies discussed can be based on GBR communications as well.

The allocation model component 308 can include functionality to store allocation strategies or allocation rules for implementing various allocation strategies based on device capabilities, as discussed herein. By way of example, a first allocation strategy can indicate, for relative or absolute numbers of 5G UEs and 4G UEs associated with a coverage area, a proportion of frequency resources within a particular frequency resource band to allocate to 5G radio access technologies or 4G radio access technologies. In some examples, the allocation model component 308 can include rules instructing the computing device 300 when to allocate additional resources to one of 5G or 4G UEs or when to allow congestion. In some examples, the allocation model component 308 can determine a minimum QoS, QoE, bandwidth, etc. for a device type, based on an intended network experience. In some examples, the allocation models can be associated with aggregated QoS or QoE metrics present in a network and updated over time to determine a most efficient allocation model for allocating resources in the network. In some examples, the allocation models can receive, as inputs, one or more of: numbers of 5G UEs and 4G UEs within a particular coverage area; frequency resource bands available for particular base stations; geographic sizes of coverage regions; occupancy and UE mix within a coverage region; historical traffic; time of day; propagation characteristics of wireless frequency resources; and the like.

By way of example and without limitation, an allocation model may be based at least in part on a type of UE (e.g., 4G or 5G) and a communication type or application type associated with a communications request. For example, a communication request from a 5G UE associated with a file download (e.g., a movie download, streaming video, web browsing) can result in frequency resources in a millimeter wave frequency or a CBRS frequency being allocated to the base station, while a communication request associated with a real-time communication (e.g., a voice call, real time text, etc.) from a 5G UE may result in frequency resources in a 4G band to be allocated to a base station to ensure latency and delay characteristics of a communication are maintained.

The base station coordination component 310 can include functionality to coordinate the allocation of frequency resources between base stations in a network. For example, the base station coordination component 310 can send and receive allocation information between different base stations to determine which resources are allocated to which radio access technology. The base station coordination component 310 can exchange congestion information to determine various congestion levels with different base stations and/or frequency resources. In some instances, if a congestion level in a first portion of a frequency resource allocated to a first radio access technology meets or exceeds a threshold congestion level, the base station coordination component 310 can send a request to another (e.g., a second) base station reducing a size (e.g., reducing a number) of a second portion of the frequency resource allocated to a second radio access technology (e.g., by deallocating a portion of frequency resources) so that the deallocated portion from the second base station can be allocated to the first base station. In some examples, the first base station is a gNodeB base station and the second base station is an eNodeB base station.

In some embodiments, the processor(s) 312 is a central processing unit (CPU), a graphics processing unit (GPU), or both CPU and GPU, or other processing unit or component known in the art.

The computing device 300 also includes additional data storage devices (removable and/or non-removable) such as, for example, magnetic disks, optical disks, or tape. Such additional storage is illustrated in FIG. 3 by removable storage 314 and non-removable storage 316. Tangible computer-readable media can include volatile and nonvolatile, removable and non-removable media implemented in any method or technology for storage of information, such as computer readable instructions, data structures, program modules, or other data. The memory 302, the removable storage 314 and the non-removable storage 316 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the computing device 300. Any such tangible computer-readable media can be part of the computing device 300.

The computing device 300 can include input device(s) 318, such as a keypad, a cursor control, a touch-sensitive display, etc. Also, the computing device 300 can include output device(s) 320, such as a display, speakers, etc. These devices are well known in the art and need not be discussed at length here.

As illustrated in FIG. 3, the computing device 300 can include one or more wired or wireless transceiver(s) 322. In some wireless embodiments, to increase throughput, the transceiver(s) 322 can utilize multiple-input/multiple-output (MIMO) technology. The transceiver(s) 322 can be any sort of wireless transceivers capable of engaging in wireless, radio frequency (RF) communication, as discussed herein. The transceiver(s) 322 can also include other wireless modems, such as a modem for engaging in Wi-Fi, WiMAX, Bluetooth, infrared communication, or the like.

Figure 4:
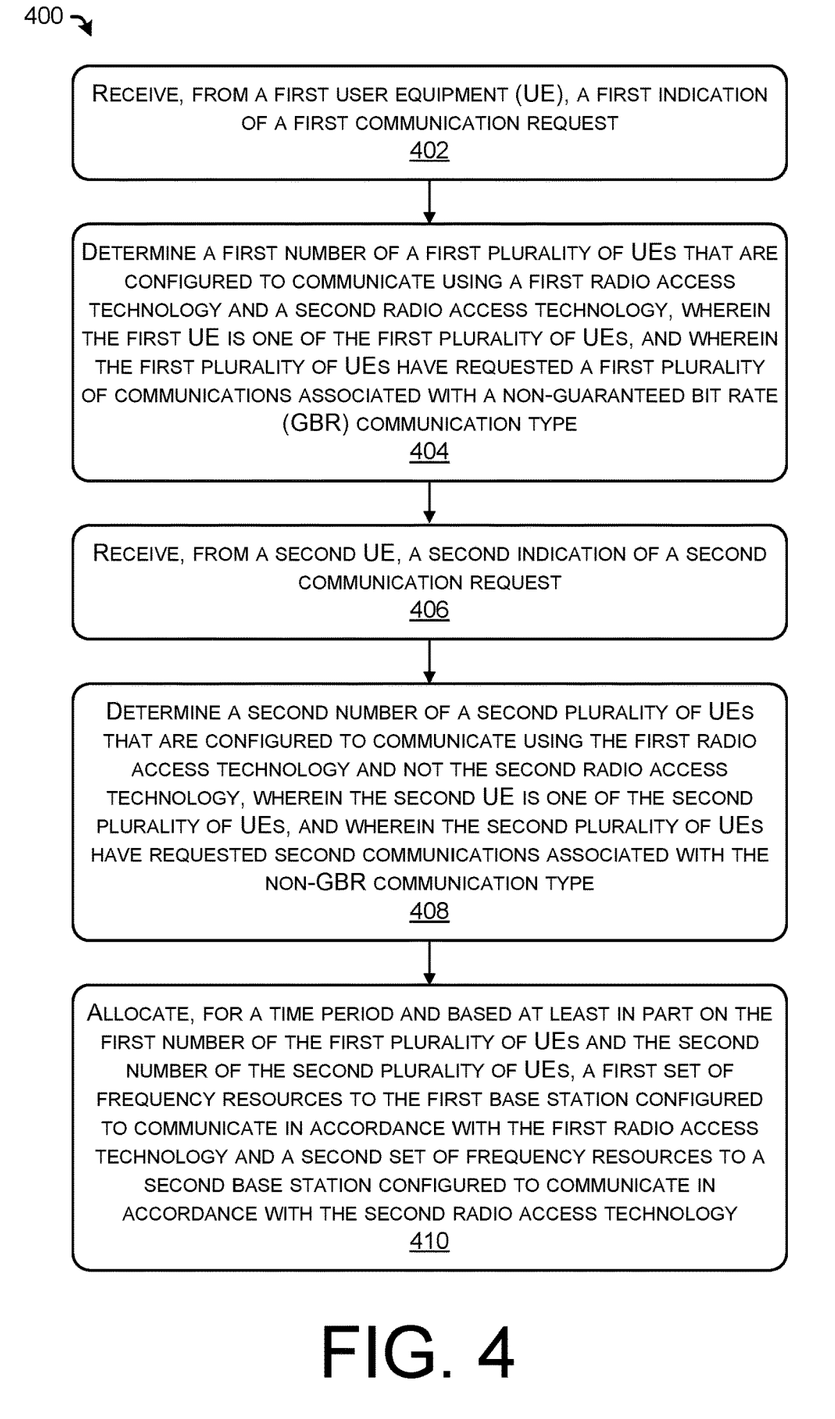
FIG. 4 illustrates an example process for dynamically allocating frequency resources to one or more base stations, in accordance with embodiments of the disclosure.
Figure 5:
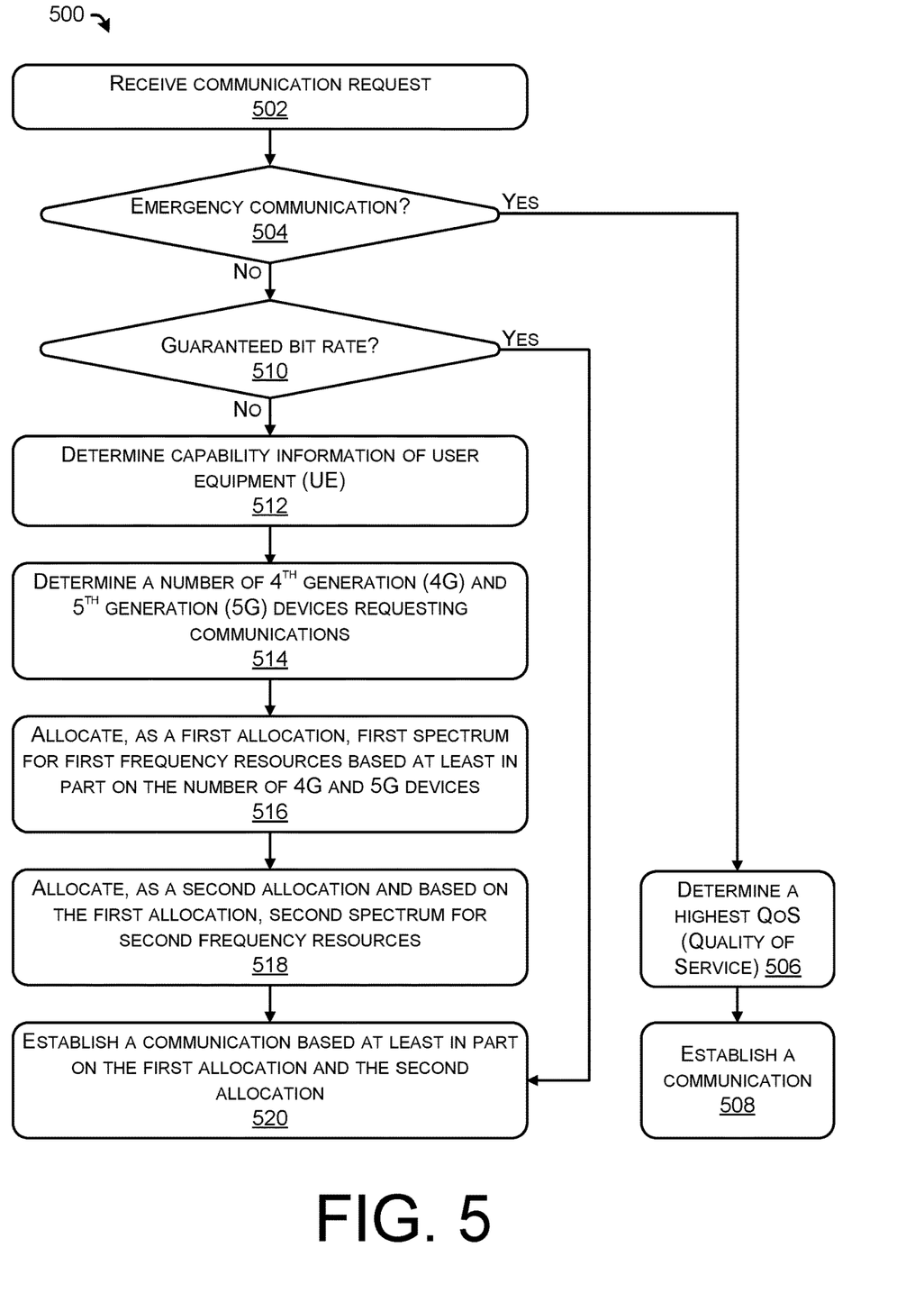
FIG. 5 illustrates another example process for dynamically allocating frequency resources to one or more base stations, in accordance with embodiments of the disclosure.

FIGS. 4 and 5 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process 400 for dynamically allocating frequency resources to one or more base stations, in accordance with embodiments of the disclosure. The example process 400 can be performed by the computing device 300 (or another component), in connection with other components discussed herein. Some or all of the process 400 can be performed by one or more devices, equipment, or components illustrated in FIGS. 1-3, for example.

At operation 402, the process can include receiving, from a first user equipment (UE), a first indication of a first communication request.

At operation 404, the process can include determining a first number of a first plurality of UEs that are configured to communicate using a first radio access technology and a second radio access technology, wherein the first UE is one of the first plurality of UEs, and wherein the first plurality of UEs have requested a first plurality of communications associated with a non-guaranteed bit rate (GBR) communication type. In some examples, the first radio access technology can correspond to the 5G radio access technology and the second radio access technology can correspond to the 4G radio access technology.

At operation 406, the process can include receiving, from a second UE, a second indication of a second communication request.

At operation 408, the process can include determining a second number of a second plurality of UEs that are configured to communicate using the first radio access technology and not the second radio access technology, wherein the second UE is one of the second plurality of UEs, and wherein the second plurality of UEs have requested second communications associated with the non-GBR communication type.

At operation 410, the process can include allocating, for a time period and based at least in part on the first number of the first plurality of UEs and the second number of the second plurality of UEs, a first set of frequency resources to the first base station configured to communicate in accordance with the first radio access technology and a second set of frequency resources to a second base station configured to communicate in accordance with the second radio access technology. In some instances, the time period can be a fixed time period after which, the operation 410 can include deallocating frequency resources or reverting to a default allocation strategy.

FIG. 5 illustrates another example process 500 for dynamically allocating frequency resources to one or more base stations, in accordance with embodiments of the disclosure. The example process 500 can be performed by the computing device 300 (or another component), in connection with other components discussed herein. Some or all of the process 500 can be performed by one or more devices, equipment, or components illustrated in FIGS. 1-3, for example.

At operation 502, the process can include receiving a communication request. In some instances, the communication request can be received from a UE and can include identity information, a communication type, an endpoint, and the like. In some instances, the communication request may be included in a SIP message/invite to initiate a communication session. In some instances, the communication request can be received in connection with a hand-in procedure. For example, when a UE requests to connect with a base station, the UE can send at least identity information (e.g., with or without a request for a communication).

At operation 504, the process can include determining whether the resource request is associated with an emergency communication. For example, an emergency communication may include an e911 call directed to a public safety answering point (PSAP). If the communication is an emergency communication, the process continues to an operation 506.

At operation 506, the process can include determining a highest Quality of Service (QoS). As indicated in the flow diagram in FIG. 5, in some instances the operations may omit intermediary operations of allocating frequency resources and/or other intermediate steps. Instead, at the operations 506, the highest QoS available (e.g., regardless of radio access type) can be selected based on the communication being an emergency communication. In some instances, the highest QoS can correspond to an absolute highest QoS providable by the base station, and in some instances, the highest QoS can correspond to any level of QoS above a QoS level to ensure a particular bit rate (or delay, jitter, etc.) for a communication.

At operation 508, the process can include establishing a communication. In some instances, the communication can be established in accordance with the QoS determined in the operation 506.

If the communication associated with the communication request is not an emergency communication (e.g., "no" in operation 504), the process continues to the operation 510.

At operation 510, the process can include determining whether the communication request is associated with a guaranteed bit rate (GBR). In some instances, the operation 510 can include determining a QCI associated with the communication request. If the communication request is associated with a GBR-type communication (e.g., "yes" in operation 510), the process can continue to operation 520, discussed below. If the communication request is associated with a non-GBR-type communication (e.g., "no" in operation 510), the process can continue to operation 512, discussed below.

At operation 512, the process can include determining capability information of user equipment (UE). In some examples, the operation 512 can include determining whether a device is a 5G UE or a 4G UE, as discussed herein.

At operation 514, the process can include determining a number of 4th generation (4G) and 5th generation (5G) devices requesting communications. In some instances, the operation 514 can include determining numbers of 4G and 5G UEs within coverage regions of base stations, as discussed herein.

At operation 516, the process can include allocating, as a first allocation, first spectrum for first frequency resources based at least in part on the number of 4G and 5G UEs. In some examples, the operation 516 can include allocating a first portion of the first frequency resources allocated to 5G UEs, while allocating a second portion of the first frequency resources to 4G UEs. For the purposes of the process 500, the first allocation can represent at least the ratio or proportion of the first portion with respect to the second portion.

At operation 518, the process can include allocating, as a second allocation and based on the first allocation, second spectrum for second frequency resources. In some examples, the operation 518 can include allocating a first portion of the second frequency resources to 5G UEs, while allocating a second portion of the second frequency resources to 4G UEs. For the purposes of the process 500, the second allocation can represent at least the ratio or proportion of the first portion with respect to the second portion (in the context of the second frequency resources).

At operation 520, the process can include establishing a communication based at least in part on the first allocation and the second allocation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors;
a memory; and
one or more components stored in the memory and executable by the one or more processors to perform operations comprising:
receiving, from a first user equipment (UE), a first indication of a first communication request;
determining that the first UE is configured to communicate using a first radio access technology and a second radio access technology, wherein the first radio access technology is a $5^{th}$ Generation (5G) radio access technology and wherein the second radio access technology is a $4^{th}$ Generation (4G) radio access technology;
determining a first number of a first plurality of UEs that are configured to communicate via the first radio access technology and the second radio access technology, wherein the first UE is one of the first plurality of UEs;
receiving, from a second UE, a second indication of a second communication request;
determining that the second UE is configured to communicate via the second radio access technology and is not configured to communicate via the first radio access technology;
determining a second number of a second plurality of UEs that are configured to communicate using the second radio access technology and not the first radio access technology, wherein the second UE is one of the second plurality of UEs;
allocating, for a time period and based at least in part on the first number of the first plurality of UEs and the second number of the second plurality of UEs, a first set of frequency resources to a first base station configured to communicate in accordance with the first radio access technology and a second set of frequency resources to a second base station configured to communicate in accordance with the second radio access technology; and
allocating, for the time period and based at least in part on the first number of the first plurality of UEs and the second number of the second plurality of UEs, a third set of frequency resources to the first base station configured to communicate in accordance with the first radio access technology and a fourth set of frequency resources to the second base station configured to communicate in accordance with the second radio access technology,
wherein the first set of frequency resources and the second set of frequency resources are associated with a first frequency resource band, and
wherein the third set of frequency resources and the fourth set of frequency resources are associated with a second frequency resource band.

2. The system of claim 1, wherein the operations further comprise:
determining that the first communication request is associated with a non-guaranteed bit rate (GBR) communication type; and
determining that the second communication request is associated with the non-GBR communication type.

3. The system of claim 1, wherein the second number of the second plurality of UEs is larger than the first number of the first plurality of UEs, and wherein the first set of frequency resources is larger than the second set of frequency resources.

4. The system of claim 1, wherein the first frequency resource band comprises first frequency resources associated with a Long-Term Evolution (LTE) Band 71 or a 5G Band 71 and the second frequency resource band comprises second frequency resources associated with an LTE Band 41 or a 5G Band 41.

5. The system of claim 1, wherein determining that the first UE is configured to communicate using the first radio access technology and the second radio access technology is based at least in part on an International Mobile Equipment Identity (IMEI) number associated with the first UE.

6. The system of claim 1, wherein allocating the first set of frequency resources to the first base station configured to communicate in accordance with the first radio access technology and the second set of frequency resources to the second base station configured to communicate in accordance with the second radio access technology is based at least in part on an allocation model.

7. The system of claim 1, wherein the operations further comprise:
receiving, from a third UE, a third indication of a third communication request;
determining that the third UE is configured to communicate using the first radio access technology and the second radio access technology;
determining a congestion level associated with the first set of frequency resources;
determining that the congestion level is above a threshold congestion level; and
increasing a number of the first set of frequency resources based at least in part on the congestion level being above the threshold congestion level.

8. A first base station comprising:
one or more processors;
a memory; and
one or more components stored in the memory and executable by the one or more processors to perform operations comprising:
receiving, from a first user equipment (UE), a first indication of a first communication request;

determining a first number of a first plurality of UEs that are configured to communicate using a first radio access technology and a second radio access technology, wherein the first UE is one of the first plurality of UEs, and wherein the first plurality of UEs have requested a first plurality of communications associated with a non-guaranteed bit rate (GBR) communication type;

receiving, from a second UE, a second indication of a second communication request;

determining a second number of a second plurality of UEs that are configured to communicate using the first radio access technology and not the second radio access technology, wherein the second UE is one of the second plurality of UEs, and wherein the second plurality of UEs have requested second communications associated with the non-GBR communication type;

allocating, for a time period and based at least in part on the first number of the first plurality of UEs and the second number of the second plurality of UEs, a first set of frequency resources to the first base station configured to communicate in accordance with the first radio access technology and a second set of frequency resources to a second base station configured to communicate in accordance with the second radio access technology;

receiving, from a third UE, a third indication of a third communication request;

determining that the third UE is configured to communicate using the first radio access technology and the second radio access technology;

determining a congestion level associated with the first set of frequency resources;

determining that the congestion level is above a threshold congestion level; and increasing a size of the first set of frequency resources based at least in part on the congestion level being above the threshold congestion level.

9. The first base station of claim 8, wherein the first radio access technology is a 5$^{th}$ Generation (5G) radio access technology and wherein the second radio access technology is a 4$^{th}$ Generation (4G) radio access technology.

10. The first base station of claim 8, wherein a first coverage area associated with the first base station partially overlaps a second coverage area associated with the second base station.

11. The first base station of claim 8, wherein the first base station is a gNodeB configured in accordance with a 5$^{th}$ Generation (5G) radio access technology, and wherein the first base station is configurable to communicate with frequency resources associated with a long-term evolution (LTE) Band 71 or a 5G Band 71, an LTE Band 41 or a 5G Band 41, and a Citizens Broadband Radio Service (CBRS).

12. The first base station of claim 11, wherein the first set of frequency resources allocated to the first base station is a first allocation, wherein the first set of frequency resources include at least a portion of first frequencies associated with the LTE Band 71 or the 5G Band 71, and wherein the operations further comprise:

allocating, for the time period, and based at least in part on the first allocation, a second allocation including a third set of frequency resources to the first base station, wherein the third set of frequency resources include a portion of second frequencies associated with the LTE Band 41 or the 5G Band 41.

13. The first base station of claim 12, wherein a first coverage area associated with the first set of frequency resources partially overlaps a second coverage area associated with the second set of frequency resources.

14. A method implemented by one or more processors, the method comprising:

receiving, from a first user equipment (UE), a first indication of a first communication request;

determining a first number of a first plurality of UEs that are configured to communicate using a first radio access technology and a second radio access technology, wherein the first UE is one of the first plurality of UEs, and wherein the first plurality of UEs have requested a first plurality of communications associated with a non-guaranteed bit rate (GBR) communication type;

receiving, from a second UE, a second indication of a second communication request;

determining a second number of a second plurality of UEs that are configured to communicate using the first radio access technology and not the second radio access technology, wherein the second UE is one of the second plurality of UEs, and wherein the second plurality of UEs have requested second communications associated with the non-GBR communication type;

allocating, for a time period and based at least in part on the first number of the first plurality of UEs and the second number of the second plurality of UEs, a first set of frequency resources to a first base station configured to communicate in accordance with the first radio access technology and a second set of frequency resources to a second base station configured to communicate in accordance with the second radio access technology;

receiving, from a third UE, a third indication of a third communication request;

determining that the third UE is configured to communicate using the first radio access technology and the second radio access technology;

determining a congestion level associated with the first set of frequency resources;

determining that the congestion level is above a threshold congestion level; and increasing a size of the first set of frequency resources based at least in part on the congestion level being above the threshold congestion level.

15. The method of claim 14, wherein the first base station is a gNodeB configured in accordance with a 5$^{th}$ Generation (5G) radio access technology, and wherein the first base station is configurable to communicate with frequency resources associated with a long-term evolution (LTE) Band 71 or a 5G Band 71, an LTE Band 41 or a 5G Band 41, and a Citizens Broadband Radio Service (CBRS).

16. The method of claim 15, wherein the first set of frequency resources allocated to the first base station is a first allocation, wherein the first set of frequency resources include at least a portion of first frequencies associated with the LTE Band 71 or the 5G Band 71, and wherein the method further comprises:

allocating, for the time period, and based at least in part on the first allocation, a second allocation including a third set of frequency resources to the first base station, wherein the third set of frequency resources include a portion of second frequencies associated with the LTE Band 41 or the 5G Band 41.

17. The method of claim 16, wherein a first coverage area associated with the first set of frequency resources partially overlaps a second coverage area associated with the second set of frequency resources.

* * * * *